United States Patent
Gonzalez et al.

(10) Patent No.: US 10,486,249 B2
(45) Date of Patent: Nov. 26, 2019

(54) MITER SAW INCLUDING FRONT ACCESSIBLE BEVEL LOCK SYSTEM

(71) Applicants: Robert Bosch GmbH, Stuttgart (DE); Arturo Gonzalez, Arlington Heights, IL (US); Plamen Marinov, Mount Prospect, IL (US); Daniel Winternitz, Chicago, IL (US)

(72) Inventors: Arturo Gonzalez, Arlington Heights, IL (US); Plamen Marinov, Mount Prospect, IL (US); Daniel Winternitz, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 43 days.

(21) Appl. No.: 15/104,047

(22) PCT Filed: Dec. 10, 2014

(86) PCT No.: PCT/US2014/069538
§ 371 (c)(1),
(2) Date: Jun. 13, 2016

(87) PCT Pub. No.: WO2015/094853
PCT Pub. Date: Jun. 25, 2015

(65) Prior Publication Data
US 2016/0318108 A1   Nov. 3, 2016

Related U.S. Application Data

(60) Provisional application No. 61/916,354, filed on Dec. 16, 2013.

(51) Int. Cl.
*B23D 45/04* (2006.01)
*B27B 5/29* (2006.01)
*B27B 27/06* (2006.01)

(52) U.S. Cl.
CPC ............. *B23D 45/048* (2013.01); *B27B 5/29* (2013.01); *B27B 27/06* (2013.01)

(58) Field of Classification Search
CPC ........ B27B 27/06; B27B 25/29; B23D 45/048
(Continued)

(56) References Cited

U.S. PATENT DOCUMENTS 4,452,117 A * 6/1984 Brickner .............. B23D 45/024
83/468
5,862,732 A * 1/1999 Itzov .................... B23D 45/044
83/471.3
(Continued)

FOREIGN PATENT DOCUMENTS

CN    201061835 Y    5/2008
CN    101875204 A    11/2010

OTHER PUBLICATIONS

International Search Report corresponding to PCT Application No. PCT/US2014/069538, dated Apr. 7, 2015 (3 pages).
(Continued)

*Primary Examiner* — Kenneth E Peterson
(74) *Attorney, Agent, or Firm* — Maginot, Moore & Beck LLP (57) ABSTRACT

A miter saw including a bevel lock assembly and bevel actuation lever assembly. The bevel lock assembly locks and unlocks a bevel post at a selected position in response to movement of an actuation handle located at a front of the miter saw easily accessible by a user. The bevel lock assembly locks the bevel post in place when the actuation handle is at a rest position. Rotation of the handle to a tensioned position unlocks the bevel lock assembly to enable repositioning of the bevel post to thereby adjust a cutting angle of a saw blade of the miter saw.

8 Claims, 7 Drawing Sheets

(58) Field of Classification Search
USPC .................................................. 83/471.3
See application file for complete search history.

(56) References Cited

U.S. PATENT DOCUMENTS

| | | | | |
|---|---|---|---|---|
| 6,142,051 | A * | 11/2000 | Garuglieri | B27B 5/206 |
| | | | | 83/468.3 |
| 6,658,977 | B2 * | 12/2003 | Chang | B23D 45/044 |
| | | | | 83/471.3 |
| 6,662,697 | B1 * | 12/2003 | Chen | B23D 45/044 |
| | | | | 83/471.3 |
| 6,758,123 | B2 | 7/2004 | Svetlik et al. | |
| 7,127,977 | B2 | 10/2006 | Carroll et al. | |
| 7,311,028 | B2 | 12/2007 | Garcia et al. | |
| 7,631,587 | B2 | 12/2009 | Svetlik et al. | |
| 7,703,366 | B2 * | 4/2010 | Garcia | B23D 45/044 |
| | | | | 83/471.3 |
| 8,047,111 | B2 * | 11/2011 | Ushiwata | B23D 45/044 |
| | | | | 83/471 |
| 8,176,823 | B2 | 5/2012 | Lawlor | |
| 2001/0000856 | A1 * | 5/2001 | O'Banion | B23D 45/044 |
| | | | | 83/76.9 |
| 2002/0144582 | A1 | 10/2002 | He | |
| 2003/0047051 | A1 * | 3/2003 | Judge | B23D 45/024 |
| | | | | 83/471.3 |
| 2003/0110914 | A1 * | 6/2003 | Brazell | B23D 45/044 |
| | | | | 83/471.3 |
| 2003/0150311 | A1 | 8/2003 | Carroll et al. | |
| 2004/0074361 | A1 * | 4/2004 | Svetlik | B23D 45/044 |
| | | | | 83/471.3 |
| 2004/0074362 | A1 * | 4/2004 | Svetlik | B23D 45/044 |
| | | | | 83/473 |
| 2005/0247177 | A1 * | 11/2005 | Hetcher | B23D 45/044 |
| | | | | 83/471.3 |
| 2006/0000331 | A1 * | 1/2006 | Ozawa | B23D 45/044 |
| | | | | 83/471.3 |
| 2006/0243113 | A1 * | 11/2006 | Kaye, Jr. | B23D 45/044 |
| | | | | 83/471.3 |
| 2007/0022853 | A1 | 2/2007 | Carroll et al. | |
| 2007/0175305 | A1 | 8/2007 | Svetlik et al. | |
| 2008/0060495 | A1 * | 3/2008 | Garcia | B23D 45/044 |
| | | | | 83/471.3 |
| 2008/0210073 | A1 * | 9/2008 | Zhang | B23D 45/044 |
| | | | | 83/471.3 |
| 2008/0276784 | A1 * | 11/2008 | Zhang | B23D 45/044 |
| | | | | 83/699.51 |
| 2009/0249933 | A1 | 10/2009 | Kaye, Jr. et al. | |
| 2010/0058909 | A1 * | 3/2010 | Chen | B23D 45/044 |
| | | | | 83/471.3 |
| 2010/0269655 | A1 * | 10/2010 | Pierga | B23D 45/044 |
| | | | | 83/165 |
| 2010/0269659 | A1 * | 10/2010 | Lawlor | B23D 45/044 |
| | | | | 83/471.3 |
| 2010/0269661 | A1 | 10/2010 | Cox et al. | |
| 2010/0269662 | A1 * | 10/2010 | Lawlor | B23D 45/044 |
| | | | | 83/471.3 |
| 2011/0011229 | A1 * | 1/2011 | Lawlor | B23D 45/044 |
| | | | | 83/100 |
| 2011/0314988 | A1 | 12/2011 | Xu et al. | |
| 2012/0160073 | A1 * | 6/2012 | Lawlor | B23D 45/044 |
| | | | | 83/471.3 |

OTHER PUBLICATIONS

Examination Report corresponding to European Patent Application No. 14 872 480 (9 pages).

* cited by examiner

MITER SAW INCLUDING FRONT ACCESSIBLE BEVEL LOCK SYSTEM

This application is a 35 U.S.C. § 371 National Stage Application of PCT/US2014/069538, filed on Dec. 10, 2014, which claims the benefit of priority to U.S. provisional patent application No. 61/916,354, filed on Dec. 16, 2013 and entitled "Miter Saw including Front Accessible Bevel Lock System," the disclosures of which are incorporated herein by reference in their entirety.

FIELD

This disclosure relates generally to the field of powered saws, and more particularly to a powered miter saw having an adjustable saw blade.

BACKGROUND

Miter saws are used for cutting many different types of material, including lumber of different types and synthetic materials. The typical miter saw includes a base or a platform on which a turntable is positioned. The turntable includes a workpiece support surface to support a workpiece to be cut by the miter saw. A support assembly is coupled to the turntable and functions to support a cutting assembly that is operable to perform a cutting operation on the work piece. The support assembly includes adjustable components which enable the cutting assembly to move away from or toward the support surface in order to cut the workpiece. The support assembly also typically includes other adjustable components configured to pivot the cutting assembly about an angle inclined with respect to a plane of the support surface along the direction of a saw blade slot in order to produce beveled or angled cuts on the work piece.

In many, if not all powered miter saws, the miter saw includes a lock system to lock or to hold the saw blade at a desired inclined cutting angle established by a user. Since the inclined cutting angle often displaces at least some of the components from a location of balance, the lock system must provide reliable and repeatable fixed locations, each of which remains stationary during a cutting operation.

Different types of bevel lock systems are known and used on miter saws and are typically characterized by complex, heavy, and expensive components. Such designs are described in the following patents and patent application: U.S. Pat. No. 7,311,028B2; U.S. Pat. No. 7,703,366B2; U.S. Pat. No. 7,127,977B2; US2009/0249933A1; US2012/0160073, U.S. Pat. No. 6,758,123B2; U.S. Pat. No. 7,631,587B2; and U.S. Pat. No. 8,176,823B2. In particular, a front accessible bevel lock system including steel cams and connecting arms is illustrated in U.S. Pat. No. 7,631,587B2. In another of the above referenced patents, U.S. Pat. No. 8,176,823B2, a bevel lock system includes two brake pads clamping on a sheet metal plate. In addition, commercially available miter saws having locking systems are available from Robert Bosch LLC of Farmington Hills, Mich. USA. Such miter saws include the Bosch CM12 miter saw equipped with a brake pad style bevel lock and the Bosch GCM12SD miter saw equipped with a front accessible bevel lock system.

As can be seen in the above references, the locking sytems include a large number of components which are arranged in complex fashion. Not only do the locking systems require accurately formed components to achieve a locking function, the number and complexity of components increases the amount of time necessary to assemble a locking system for a miter saw. Therefore, there is a need for a powered miter saw having an adjustable saw blade which can be fixed in position using a locking system having a reduced footprint, reduced complexity, and reduced assembly time.

SUMMARY

In one embodiment, there is provided a miter saw having a front accessible bevel lock which is relatively uncomplicated to assemble, which provides a cost-effective design, and is relatively simple to repair if the bevel lock mechanism becomes defective. The bevel lock mechanism includes a user accessible control for activating the lock at the front of a miter saw.

The bevel lock activation mechanism includes a wire, rope or cable. The need for complex cams and steel connecting arms found in other designs is eliminated. In one or more embodiments, the bevel locking system and the miter saw incorporating the bevel locking system provide a reduced cost and assembly time when compared to existing systems. Other advantages include providing for easier user activation when compared to over-center cam mechanisms having spring-loaded levers. Overall miter saw and locking system weight is reduced by replacing steel components with a wire cable in one embodiment. In addition, the number and complexity of individual components and subassemblies is reduced.

In accordance with one embodiment of the disclosure, there is provided a miter saw including a front accessible bevel locking system that includes a steel cable, cam and lever arms to momentarily disengage the bevel lock in order to adjust the saw's bevel angle.

In accordance with another embodiment of the disclosure, there is provided a miter saw and bevel lock system including two primary assemblies, a bevel locking assembly and a bevel actuation lever assembly.

DESCRIPTION

For the purposes of promoting an understanding of the principles of the embodiments disclosed herein, reference is now made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 1:
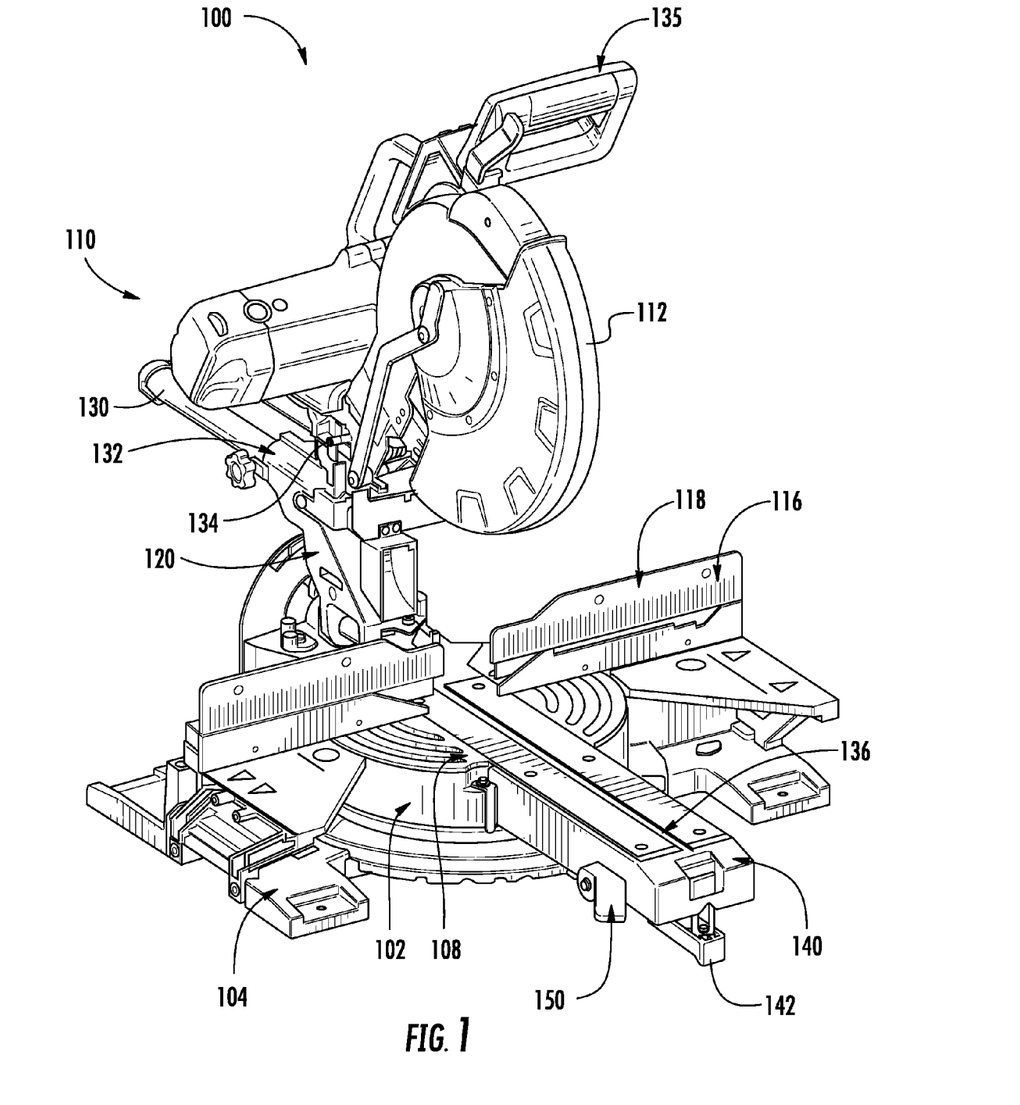
FIG. 1 is a schematic perspective view of a miter saw with a front accessible bevel lock system.

FIG. 1 is a schematic elevational side view of a saw device such as a miter saw 100 including a turntable 102 supported by a base 104. Other saw devices include a table saw, a planar, a compound saw, a floor saw, a bevel saw, or a device having a saw blade and base supporting the blade. The turntable 102 is rotatably adjustable on the base 104 about a pivot axis extending generally perpendicular to a plane defined by a support surface 108 of the turntable 102, and includes a support arm 140.

The miter saw 100 includes a support assembly 110. The support assembly 110 is configured to support a saw blade (not shown) located within a blade guard 112, and includes a bevel post 120, and one or more support bars 130. A guide fence 116 is mounted on the turntable 102. The saw blade is configured to cut a workpiece supported on one side by the support surface 108 and on another side by the guide fence 116. A pivot mechanism 134 is rotatably coupled to the saw blade The guide fence 116 includes a workpiece guide surface 118 upon which the workpiece is positioned for a cutting operation. The guide fence 116, as illustrated, is generally perpendicularly aligned with the turntable surface 108. In other embodiments, the guide fence 116 is adjustable such that the workpiece guide surface 118 is inclined with respect to the turntable surface 108.

The bevel post 120 is rotatably supported on the turntable 102 about an axis 122 (See FIGS. 2 and 3) that may be generally parallel to the turntable surface and aligned with a cutting plane of the blade. The bevel post 120 rotates about the axis 122 to provide angle cuts to the workpiece. The one or more support bars 130 are configured to support a portion 132 of the bevel post 120 for sliding movement. One end of the bar(s) 130 extend(s) toward the saw blade and terminates where. The saw blade is rotatably positionable around a pivot of the pivot mechanism 134, the position of which is fixed and released by a handle 135. Since the support bars 130 slide within the portion 132, the saw blade is positionable in a direction of and along a cutting slot 136 of the turntable 102. In addition, the saw blade 122 is adjustable about an arc defined by the pivot mechanism 134.

The support arm 140 extends from the turntable 102 and provides an additional support surface for supporting a workpiece if necessary. A turntable lock 142 located at a terminating end of the support arm 140 locks and unlocks the turntable 102 at a location determined by a user.

Figure 7:
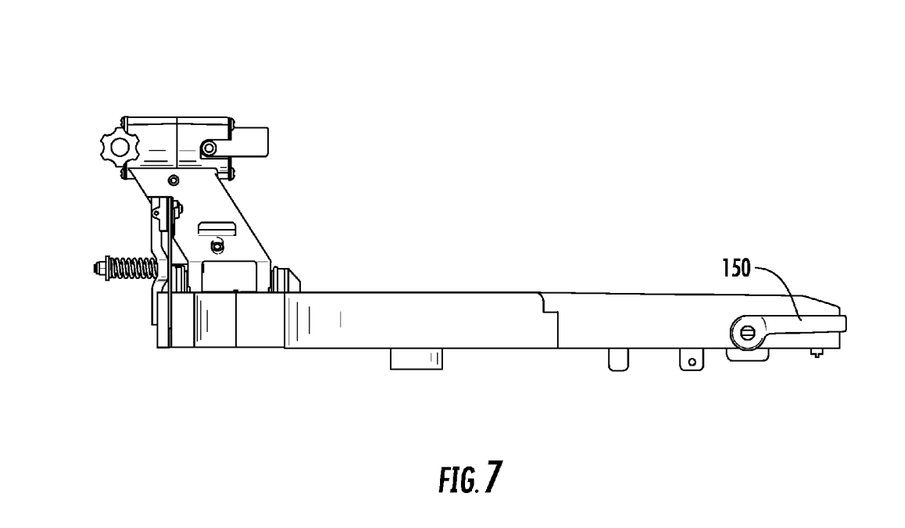
FIG. 7 is a schematic elevational side view of a miter saw including a bevel lock system in a rest, closed, or locked position.
Figure 8:
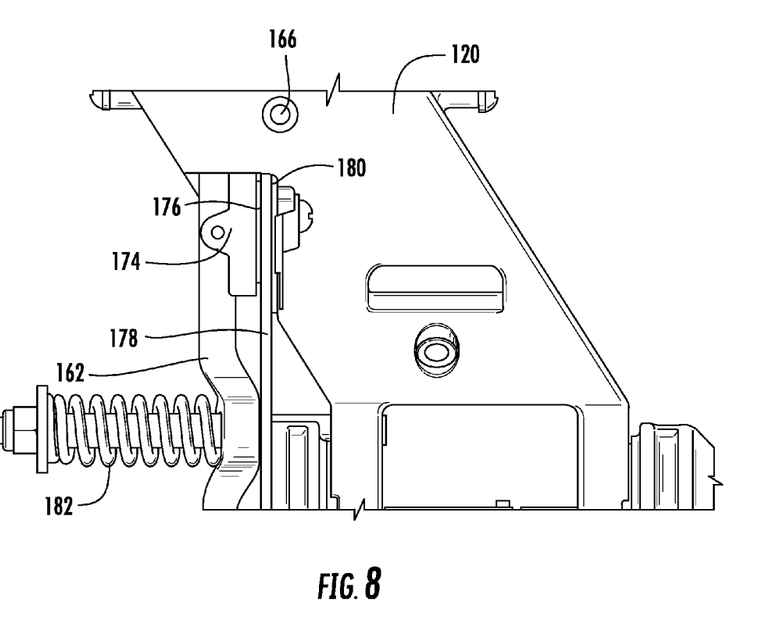
FIG. 8 is a schematic elevation side view of the bevel lock system of FIG. 7.

A bevel lock handle 150 is located on one side of the support arm 140. In other embodiments, the bevel lock handle 150 may be located on other sides or portions of the support arm 140. In addition, the bevel lock handle 150 in other embodiments may include a pushbutton or other levers to lock and unlock the bevel lock post 120. The bevel lock handle 150 is one component of a bevel lock assembly described herein and includes a locked position, as illustrated in FIGS. 1, 7 and 8, and an unlocked position illustrated in FIGS. 9 and 10. The bevel lock handle 150 is positionable to lock the bevel post 120 at a selected location and to unlock the bevel post 120 for movement and locking at a new location selected by a user. Other examples of bevel lock handle 150 such as an electronic button other than a mechanical button are possible.

Alternatively, the bevel lock handle 150 can be replaced by a touch sensor lock, a GMR sensor lock, a motion sensor lock, a pressure sensor lock, a bolometer lock, a transducer lock, or the like to lock and unlock the bevel post 120 for the same purpose. The lock handle 150 can be controlled via a user by directly locking or unlocking the lock handle, or indirectly via an electronic control connected to the saw device 100, or another electronic device such as cellular phone, smart phone, tablet, Ptablet, console, remote control, or the like through wired or wireless communication protocol (WiFi, NFC, Bluetooth, UWB, Internet, or the like).

Figure 2:
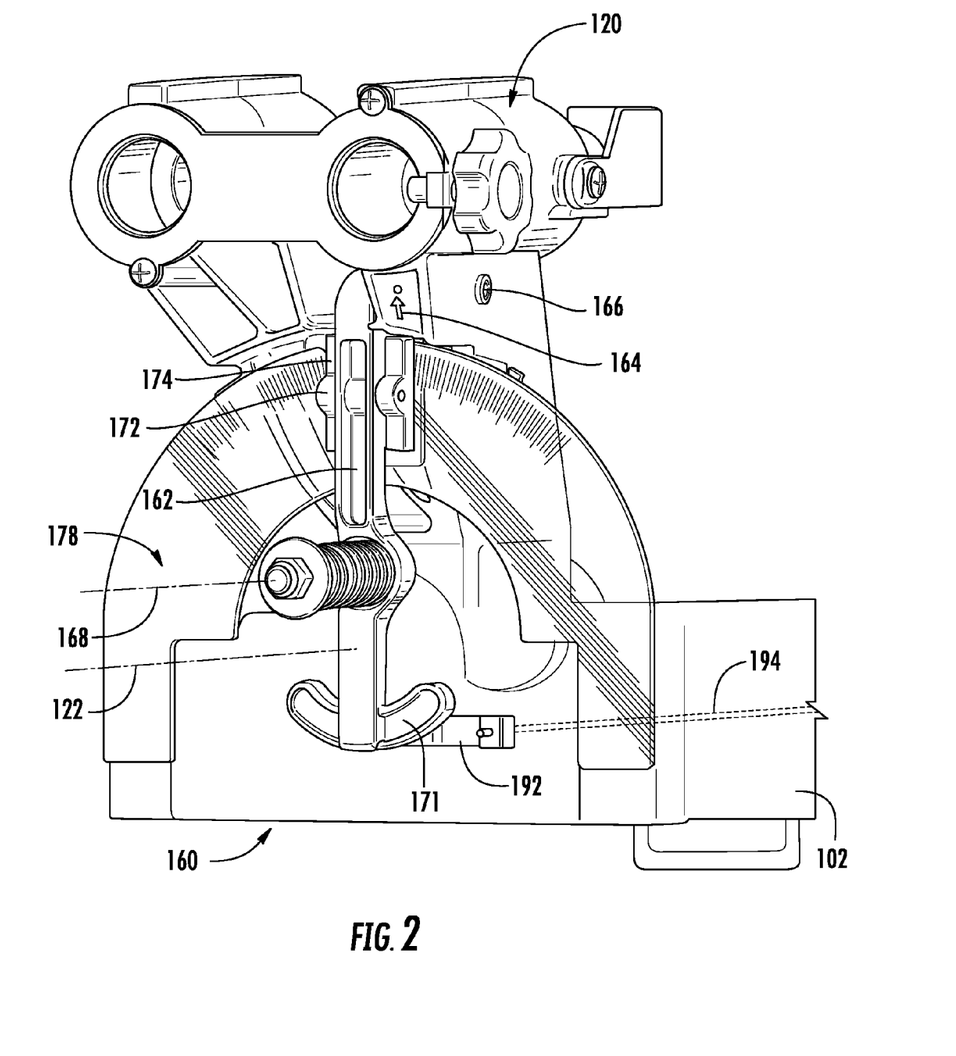
FIG. 2 is a schematic perspective view a portion of a bevel lock assembly for a miter saw including a rotor and a table.
Figure 3:
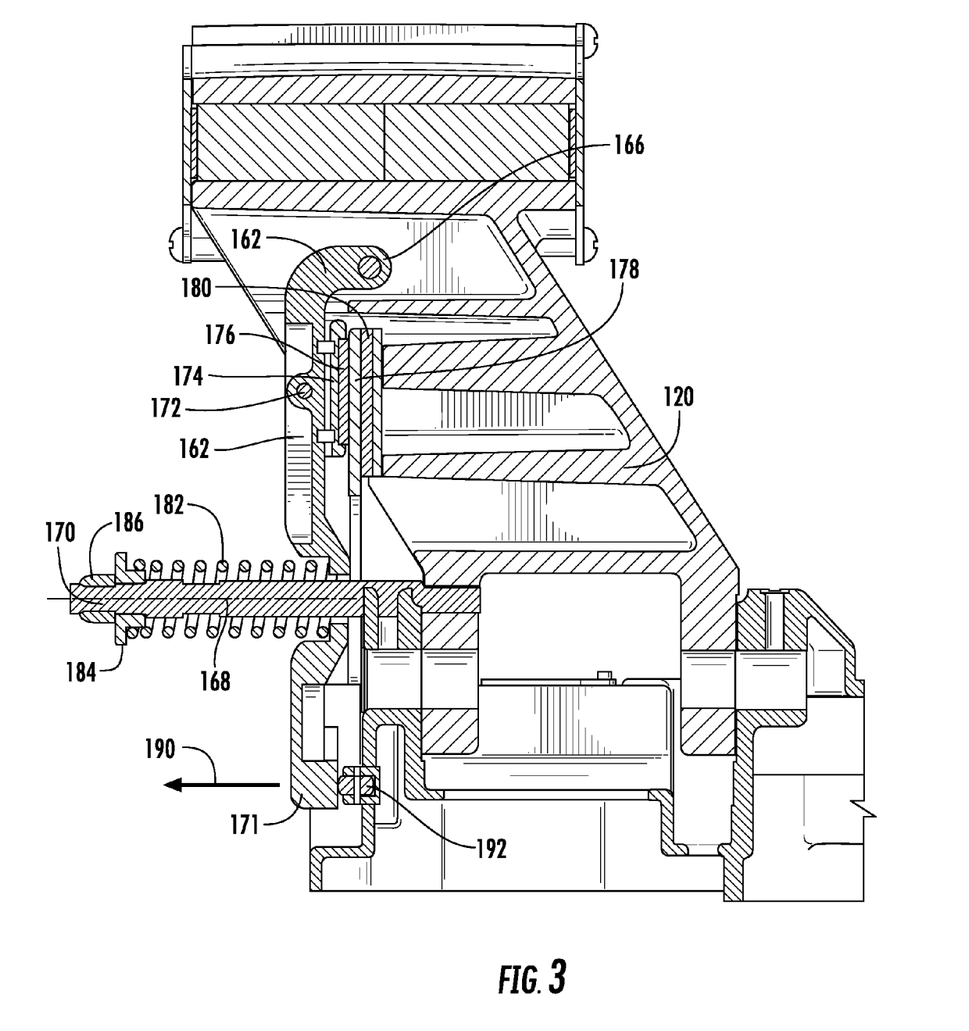
FIG. 3 is a schematic cross-sectional side view of a portion of a bevel lock assembly for a miter saw.

FIGS. 2 and 3 illustrate one of two primary assemblies comprising the bevel lock assembly. A first bevel lock assembly 160 includes a clamp arm 162 having a first end which is pivotably connected to the bevel post 120 at a pivot connection 164 by way of a pivot pin 166 about which the clamp arm 162 pivots at a first pivot. The pivot pin 166 may extend through a boss, formed in the bevel post 120, and a hole, formed at a first end of the clamp arm 162.

In addition to being pivotably located at the bevel post 120, the clamp arm 162 rotates about a second pivot 168 defined by a rod or post 170 fixedly attached to the bevel post 120 as further illustrated in FIG. 3. The second pivot 168 may be substantially perpendicular to the pivot axis of the pivot pin 166. The post 170 extends through an aperture of the clamp arm 162 such that the clamp arm 162 rotates about the second pivot 168. An extended lug or projection 171 is located at a second end of the clamp arm 162 and is configured in the shape of an arc. The arc generally follows a radius of curvature defined by the rotation of a second end of the arm 162 about the second pivot 168.

The clamp arm 162 further includes a pad pivot 172 to which a pad support 174 is pivotably coupled. The pad pivot 172 defines a pivot axis that may be generally parallel to the pivot axis defined by the pivot pin 166. The pad support 174 includes an outer brake pad 176 (see FIG. 3) which is configured to contact a rotor 178 fixedly attached to the turntable 102. In one embodiment, the rotor is made of a sheet metal. An inner brake pad 180 is fixedly attached to the bevel post 120 such that forced contact of the pad support 174 to the rotor 178 engages the rotor 178 with the inner brake pad 180 to lock the bevel post 120 in position. The pad pivot 172 allows the brake pad 176 to pivot to insure flush contact with the rotor 178.

As illustrated in FIG. 3, the post 170 extends through an aperture of the clamp arm 166 and extends through a resilient member such as a spring 182. While a helical spring 182 is illustrated, in other embodiments other types of springs including a leaf spring and a flat spring may be included. The spring 182 may be retained on the post 170 by a washer 184 and a nut 186, although other mechanisms for retaining the spring 182 on the post 170 are contemplated. The spring 182 located on the rod 170 is in a loaded condition such that the locations of the washer 184 and nut 186 prestress the spring 182. In the prestressed condition, the clamp arm 162 is forced toward the bevel post 120 about the pivot 166 such that the outer brake pad 176 is forced into contact with the rotor 178 as long as a force is not applied at the extended lug 171 in a direction away from the turntable 102. Consequently, as long as no force or a minimal force is applied at the second end of the arm 162, the bevel post 120 remains in a locked position.

To unlock the first bevel lock assembly 160, a force is applied in a direction 190 with a cam arm 192 which contacts an interior surface of the extended lug 171 to move the second end of the clamp arm 162 away from the turntable 102. The cam arm 192 is a component of a second bevel lock assembly described later herein. In response to the force, the clamp arm 162 rotates about the pivot 166 and the outer brake pad 176 moves away from the rotor 178 to unlock the first bevel lock assembly 160. Once the outer brake pad 176 is sufficiently distanced from the rotor 178, the bevel post 120 is free to move about the pivot 122 to another location which alters the inclined angle of the cutting plane of the saw blade with the plane of the support surface 108 of the turntable 102. Movement of the cam arm 192 in the direction 190 compresses the spring 182 an additional amount. Once the cam arm is released, the spring returns the arm and the brake pad to the locked position.

Figure 4:
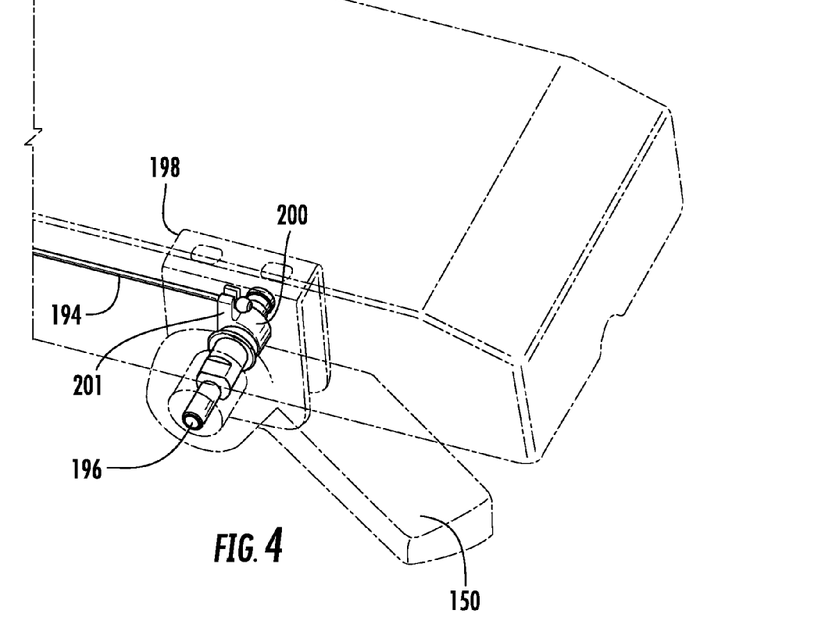
FIG. 4 is a schematic perspective view of a portion of a bevel lock assembly for a miter saw including an actuation lever assembly.
Figure 5:
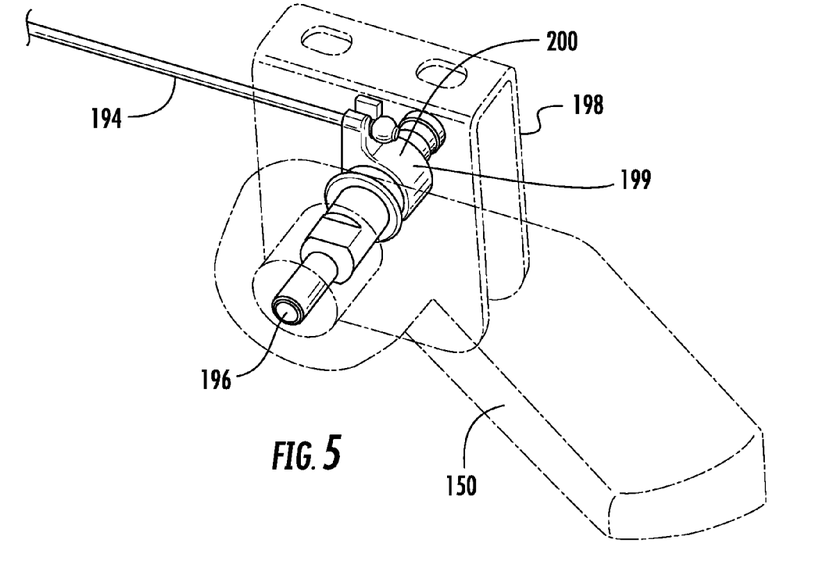
FIG. 5 is a schematic perspective view of a portion of a bevel lock assembly for a miter saw including an activation handle and a mounting bracket.

As further illustrated in FIGS. 4 and 5, a second bevel lock assembly, also called a bevel actuation lever assembly, includes the bevel lock handle or activation handle 150 which locks or unlocks the first bevel lock assembly 160. The activation handle 150 is coupled to a wire, cable, rope or string 194 which is coupled to the cam arm 192 as seen in FIG. 2. In different embodiments, the cable 194 is a solid material, a threaded material or a braided material formed of a metal or other material, such as a polymer. The bevel actuation assembly includes a rod 196, which is fixed to the support arm 140. The rod 196 acts as a pivot shaft for the activation handle 150, both of which are supported by a mounting bracket 198 through which the rod 196 is inserted. In one embodiment, the bracket 198 is formed of a sheet metal bent in the shape of a "U" and located within the support arm 140. A collar 200 is fixedly located on the rod 196 and includes an extended lug 201 which captures one end of the cable 194. Movement of the handle 150 and the rod 196 (which form a pivot arm 199), thereby pulls the cable 194 toward the terminating end of the support arm 140 or moves the terminating end of cable 194 of FIG. 4 away from the terminating end of the support arm 140.

Figure 6:
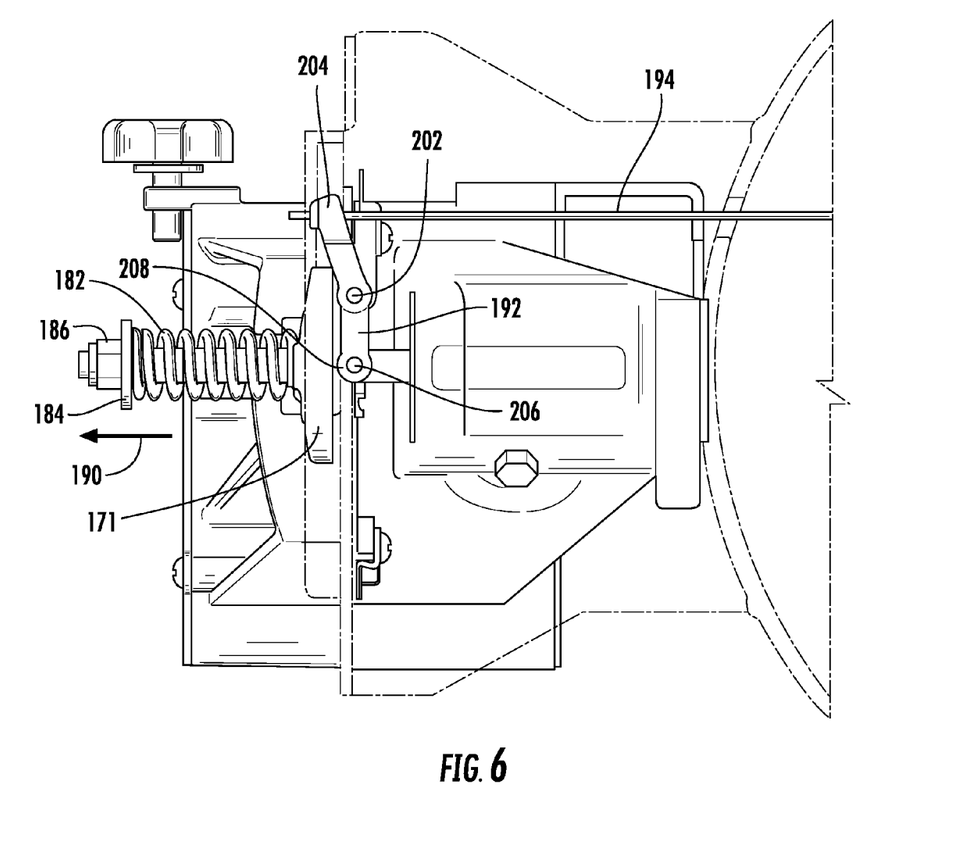
FIG. 6 is a schematic perspective bottom view of an accessible bevel lock system including cam arm components.

FIG. 6 illustrates a bottom plan view of the cam arm 192 which is also seen in FIGS. 2 and 3. The cam arm 192 is pivotally connected to the turntable 102 at a pivot connection 202. A second end of the cable 194 is fixed to a first end 204 of the cam arm 192 which thereby responds to movement of the activation handle 150. The cam arm 192 includes a second end 206 which includes a contact portion 208 configured to contact the extending lug 171 of the clamp arm 162. When the cable 194 is placed under tension by the activation handle 150, the contact portion 208 engages the extending lug 171 which is forced in direction 190 and which compresses the spring 182. Compression of the spring 182 unlocks the locking mechanism and the bevel post 120 is free to move.

As previously described in FIG. 2, the extending lug 171, in one embodiment, may be formed along the line of an arc. Since the clamp arm 162 is fixed to the bevel post 120 at the pivot pin 166, the arc shaped portion of the extending portion 171 moves along a path which is accessible for contact by the cam arm 192. In other embodiments, the extending portion 171 is rectangular, but includes a sufficient contact area such that cam arm 192 contacts the extending portion 171 in all positions of the bevel post 120.

FIG. 7 is a schematic elevational side view of a portion of the miter saw including a bevel lock system in a rest, closed, or locked position. In FIGS. 7 and 8, the activation handle 150 is positioned to be substantially parallel with the support surface of the table. In this position, the cable is in a released position having a tension insufficient to move the cam arm 192 into contact with the clamp arm 162. In this position, the outer brake pad 176 contacts the rotor 178 to lock the bevel post 120 in position.

Figure 9:
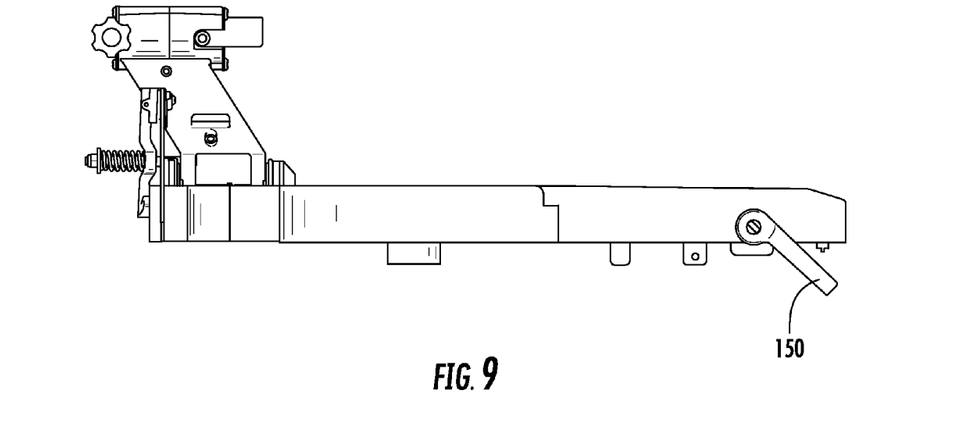
FIG. 9 is a schematic elevational side view of a miter saw including a bevel lock system in an activated, open, or unlocked position.
Figure 10:
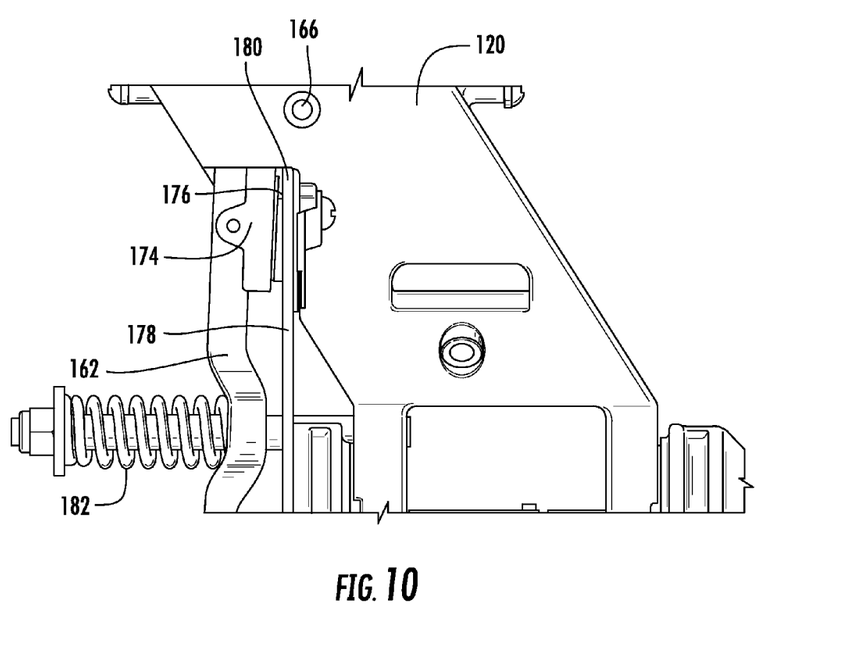
FIG. 10 is a schematic elevation side view of the bevel lock system of FIG. 9.

As further illustrated in FIGS. 9 and 10, the activation handle 150 is depressed or moved by a user to a position where the activation handle 150 is inclined with respect to the support surface of the table. In this position, the user disengages the bevel lock by applying a tension to the cable 194 which causes the cam arm 192 to move into contact with the clamp arm 162 such that the brake pad 176 moves away from the rotor 180 to thereby unlock the bevel post for free rotation. In one embodiment, the bevel lock assembly includes a ratchet assembly such that the handle 150 includes a continuous or fine adjustment such that a sufficient amount of tension is applied by the cable 194 to vary the force applied by the brake pad 176 to the rotor 180.

With the described embodiments, the bevel lock system is locked when in the rest position, i.e. no tension is applied by the handle 150 to the cable 194. By rotating the activation handle 150, the user momentarily disengages the bevel lock thereby permitting movement of the bevel post 120. Once the activation handle is released, i.e. returned to the illustrated horizontal position of FIG. 7, the locking system is automatically returned to the locked position due to the compression spring in the bevel lock assembly. In other embodiments, other positions of the activation handle 150 for locking and unlocking the bevel lock system are possible.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following embodiments. The following embodiments are provided as examples and are not intended to be limiting.

It is claimed:

1. A power tool, comprising:
   a table having a support surface configured to support a workpiece;
   a bevel post connected to the support surface such that the bevel post is pivotable about a first pivot axis;
   a work tool connected to the bevel post; and
   a locking mechanism that includes:
      a locking assembly movably attached to the power tool at a first location so as to move with respect to the bevel post between a locked and an unlocked position, the locking assembly including a clamping arm pivotably attached to the bevel post and configured to move between a first clamping arm position corresponding to the locked position of the locking assembly and a second clamping arm position corresponding to the unlocked position of the locking assembly, the locking assembly configured to:
         retain the bevel post at any one of a plurality of angular positions with respect to the first pivot axis between and including the first and second angular positions when in the locked position; and
         enable the bevel post to pivot with respect to the first pivot axis when in the unlocked position; and
      an actuator assembly that includes:
         an activation member movably attached to the table at a second location for movement between a first and second position, the second location located on a front side of the table opposite a third location at which the bevel post is attached to the table; and an activated member movably attached to the table proximate the first location, the activated member engaging the clamping arm, a connecting member including a cable operatively connected to the activation member, the connecting member extending between the first location and the second location, and connecting the activation member and the activated member such that movement of the activation member to the first position causes the locking assembly to move to the locked position, and movement of the activation member to the second position causes the activation member to pull the cable so as to move the locking assembly to the unlocked position, wherein the clamping arm includes an extending portion configured to move relative to the activated member about the first pivot axis, the extending portion staying in operative engagement with the activated member at any one of the plurality of angular positions with respect to the first pivot axis.

2. The power tool of claim 1, wherein the power tool is a miter saw.

3. The power tool of claim 1, the activation member having:

a handle that enables a user to manually move the activation member between the first and second positions.

4. The power tool of claim 1, the locking assembly further including:

a first brake member configured to apply a braking force to the bevel post when the clamping arm is in the first clamping arm position, and release the braking force from the bevel post when the clamping arm is in the second clamping arm position.

5. The power tool of claim 4, the locking assembly further including:

a biasing member configured to apply a biasing force to the clamping arm that biases the clamping arm towards the first clamping arm position and causes the first brake member to apply the braking force.

6. The power tool of claim 5, the activated member comprising a cam arm movably attached to the power tool proximate to the first location and operatively connected to the activation member via the connecting member such that, when the activation member is moved to the second position, the cam arm moves the clamping arm to the second clamping arm position;

the cam arm being configured to apply a release force to the clamping arm in opposition to the biasing force, the release force being greater than the biasing force.

7. The power tool of claim 6, wherein the cable is operatively connected to the cam arm and configured to move the cam arm to apply the release force in response to being pulled by the activation member.

8. The power tool of claim 7, the locking assembly further comprising:

a rotor attached to the power tool and interposed between the brake member and the bevel post; and a second brake member secured to the bevel post on an opposite side of the rotor from the first brake member;

wherein when the first brake member applies the braking force, the first brake member presses the rotor against the second brake member.

* * * * *